(12) United States Patent
De Margerie et al.

(10) Patent No.: US 10,945,923 B2
(45) Date of Patent: Mar. 16, 2021

(54) PRODUCTION LINE FOR THE PRODUCTION OF MEDICINAL PRODUCTS AND PRODUCTION PLANT COMPRISING SUCH A PRODUCTION LINE

(71) Applicant: RONDOL INDUSTRIE, Strasbourg (FR)

(72) Inventors: Victoire De Margerie, Strasbourg (FR); Donatien Bruggeman, Strasbourg (FR); Hans Mayer, Strasbourg (FR)

( * ) Notice: Subject to any disclaimer, the term of this patent is extended or adjusted under 35 U.S.C. 154(b) by 323 days.

(21) Appl. No.: 15/738,401

(22) PCT Filed: Jun. 23, 2016

(86) PCT No.: PCT/EP2016/064539
§ 371 (c)(1),
(2) Date: Dec. 20, 2017

(87) PCT Pub. No.: WO2016/207279
PCT Pub. Date: Dec. 29, 2016

(65) Prior Publication Data
US 2018/0185244 A1    Jul. 5, 2018

(30) Foreign Application Priority Data

Jun. 23, 2015    (FR) .................................... 15 55783

(51) Int. Cl.
*A61J 3/07*    (2006.01)
*A61J 3/06*    (2006.01)
(Continued)

(52) U.S. Cl.
CPC . *A61J 3/07* (2013.01); *A61J 3/06* (2013.01); *A61J 3/08* (2013.01); *B29C 48/022* (2019.02);
(Continued)

(58) Field of Classification Search
CPC ........ A61J 3/07; A61J 3/08; A61J 3/06; A61J 2200/20; A61J 2200/44; A61J 2200/42;
(Continued)

(56) References Cited

U.S. PATENT DOCUMENTS 3,645,659 A * 2/1972 Schott, Jr. ............. B29C 48/686
425/204
3,696,061 A * 10/1972 Selsor et al. .......... B29C 67/202
521/64

(Continued)

FOREIGN PATENT DOCUMENTS

| CN | 101559023 A | 10/2009 |
|---|---|---|
| CN | 201676290 | 12/2010 |

(Continued)

OTHER PUBLICATIONS

Preliminary Search Report received in FR 15557983 dated Apr. 29, 2016.
(Continued)

*Primary Examiner* — Jeffrey M Wollschlager
(74) *Attorney, Agent, or Firm* — Knobbe, Martens, Olson & Bear, LLP (57) ABSTRACT

A production line is, suitable for the production of medicinal products that include at least one active ingredient. The production line includes an extruder for producing an extrudate from the active ingredient and at least one excipient intended to form an encapsulating matrix of the active ingredient, and a cooling member for cooling the extrudate at the outlet of the extruder. The extruder includes a barrel and at least two parallel screws housed in the barrel and interpenetrating with one another to mix the or each active ingredient with the or each excipient. The barrel is oriented vertically and the footprint occupied by the production line is less than 0.5 m².

11 Claims, 5 Drawing Sheets

(51) Int. Cl.
*A61J 3/08* (2006.01)
*B29C 48/00* (2019.01)
*B29C 48/40* (2019.01)
*B29C 48/14* (2019.01)

(52) U.S. Cl.
CPC .......... *B29C 48/141* (2019.02); *B29C 48/402* (2019.02); *A61J 2200/20* (2013.01); *A61J 2200/40* (2013.01); *A61J 2200/42* (2013.01); *A61J 2200/44* (2013.01); *B29C 48/142* (2019.02); *B29C 2791/005* (2013.01)

(58) Field of Classification Search
CPC ... B29C 48/402; B29C 48/022; B29C 48/142; B29C 48/40; B29C 48/911; B29C 48/92; B29C 48/02; B29C 48/141; B29C 2791/005
See application file for complete search history.

(56) References Cited

U.S. PATENT DOCUMENTS

| | | | | |
|---|---|---|---|---|
| 3,767,347 | A * | 10/1973 | Landoni | D01D 1/06 425/378.2 |
| 4,092,089 | A | 5/1978 | Backer et al. | |
| 4,859,166 | A * | 8/1989 | Hamada | B29C 48/395 425/204 |
| 5,432,250 | A * | 7/1995 | Yamato | C08G 64/30 526/65 |
| 5,686,632 | A * | 11/1997 | Walsh | A61K 9/1688 549/410 |
| 6,093,009 | A * | 7/2000 | Jacks, Jr. | F01C 17/02 418/201.1 |
| 6,139,872 | A * | 10/2000 | Walsh | A23P 10/25 424/464 |
| 6,298,751 | B1 * | 10/2001 | Ide | B29C 48/40 74/665 GA |
| 6,306,438 | B1 * | 10/2001 | Oshlack | A61P 29/00 424/468 |
| 6,593,053 | B1 * | 7/2003 | Chang | B29C 48/92 430/137.18 |
| 7,172,399 | B2 * | 2/2007 | Reutter | D01D 1/09 264/169 |
| 9,539,305 | B1 * | 1/2017 | Pace | A61K 38/15 |
| 2004/0219220 | A1 | 11/2004 | Sherry et al. | |
| 2009/0263448 | A1 * | 10/2009 | Hobot | A61K 9/0019 424/423 |
| 2010/0021540 | A1 * | 1/2010 | Gopinathan | A61K 31/513 424/464 |
| 2010/0099696 | A1 * | 4/2010 | Soscia | A61K 9/2086 514/282 |
| 2010/0316821 | A1 * | 12/2010 | Chang | B29C 48/255 428/35.8 |
| 2011/0037185 | A1 * | 2/2011 | Kowalski | A61K 9/4833 264/6 |
| 2011/0052645 | A1 * | 3/2011 | Coulter | A61J 3/07 424/400 |
| 2011/0059140 | A1 * | 3/2011 | Winter | B29C 48/405 424/400 |
| 2011/0215501 | A1 * | 9/2011 | Elyasi | B29C 41/42 264/219 |
| 2012/0064327 | A1 * | 3/2012 | Schutz | D01D 5/0885 428/220 |
| 2012/0205830 | A1 * | 8/2012 | Ghosh | A61K 9/2095 264/40.4 |
| 2013/0157049 | A1 * | 6/2013 | Shannon | B29B 7/7495 428/343 |
| 2013/0245147 | A1 * | 9/2013 | Altmann | C09K 5/063 521/143 |
| 2014/0234460 | A1 * | 8/2014 | Roberts | B29C 48/2565 425/162 |
| 2014/0242209 | A1 * | 8/2014 | Roberts | B29C 48/68 425/376.1 |
| 2014/0271964 | A1 * | 9/2014 | Roberts, IV | B29C 64/106 425/150 |
| 2015/0040428 | A1 * | 2/2015 | Davis | A43B 13/023 36/83 |
| 2015/0057304 | A1 * | 2/2015 | Thompson | A61P 25/36 514/282 |
| 2015/0158228 | A1 * | 6/2015 | Scholtens | B29C 48/2715 264/211.23 |
| 2016/0236408 | A1 * | 8/2016 | Wolf | B29C 64/106 |
| 2016/0303768 | A1 * | 10/2016 | Usui | C08L 29/04 |
| 2016/0318248 | A1 * | 11/2016 | Susnjara | B25J 19/0025 |

FOREIGN PATENT DOCUMENTS

| | | |
|---|---|---|
| CN | 201676290 U | 12/2010 |
| EP | 2 198 856 A1 | 6/2010 |
| JP | 1982-080036 A | 5/1982 |
| JP | 1996-057289 A | 3/1996 |
| JP | 2011-502059 A | 1/2011 |
| JP | 20111-89550 A | 9/2011 |
| JP | 2014-531994 A | 12/2014 |
| WO | WO 2009/057107 A2 | 5/2009 |
| WO | WO2013030226 * | 3/2013 |

OTHER PUBLICATIONS

International Search Report received in PCT Application No. PCT/EP2016/064539 dated Aug. 31, 2016, in two pages.
Written Opinion received in PCT Application No. PCT/EP2016/064539, in five pages dated Aug. 31, 2016.

* cited by examiner

PRODUCTION LINE FOR THE PRODUCTION OF MEDICINAL PRODUCTS AND PRODUCTION PLANT COMPRISING SUCH A PRODUCTION LINE

This application is the U.S. National Phase under 35 U.S.C. § 371 of International Application No. PCT/EP2016/064539, filed Jun. 23, 2016, designating the U.S., and published in French as WO 2016/207279 A1 on Dec. 29, 2016, which claims priority to French Patent Application No. 1555783, filed Jun. 23, 2015, the entire contents of which are incorporated herein by reference.

BACKGROUND OF THE INVENTION

Field of the Invention

The present invention relates to a production line for the production of medicinal products comprising at least one active ingredient, the production line being of the type comprising an extruder, for producing an extrudate from the active ingredient and at least one excipient intended to form an encapsulating matrix of the active ingredient, and a cooling member for cooling the extrudate at the outlet of the extruder, the extruder comprising a barrel and at least two parallel screws housed in the barrel and interpenetrating with one another to mix the or each active ingredient with the or each excipient.

Description of Related Art

Production lines of the aforementioned type are known. They make it possible to produce medicinal products in the form of granules, at a reduced cost. They further make it possible to improve the therapeutic efficacy of medicinal products and extend their conservation duration.

One problem, however, encountered in the use of production lines of the aforementioned type is the fragility of the active ingredients, some being likely to deteriorate quickly at moderately high temperatures of around 60° C. The first extrusion production lines used to produce medicinal products were thus only appropriate for the production of medicinal products using the least fragile active ingredients.

The Applicant has, since the early 2010s, offered extrusion production lines making it possible to produce medicinal products based on the most fragile active ingredients. These production lines, which have smaller dimensions relative to the production lines previously used, make it possible to use lower doses of active ingredients and provide reinforced monitoring of the mixing temperature during extrusion.

However, the existing production lines are not fully satisfactory. Indeed, these production lines must be used in clean rooms within the meaning of standards ISO 14644 (more commonly known as "white rooms"), so as to avoid contamination of the produced medicinal products. However, these clean rooms are very expensive to build and maintain, and the existing production lines generally occupy a substantial footprint in said clean rooms, the most compact of them still taking up a surface area of 2 m². This clean room surface area occupied by the production lines thus represents a substantial excess cost for these production lines.

Furthermore, the comings and goings of operators to manipulate the production lines installed in the clean room, in particular to load these production lines with active ingredient and excipient and to control said production lines, increases the risks of contamination of the clean room. It is then necessary to reinforce the decontamination protocols for the clean room, which increases its cost, failing which there is an increased risk of contamination of the produced medicinal products.

One aim of the invention is to reduce the costs associated with the use of production lines of the aforementioned type in a clean room. Other aims are to reduce the footprint occupied by these production lines in a clean room, and to limit the human interventions that must be carried out on said production lines in a clean room.

To that end, the invention relates to a production line of the aforementioned type, in which the barrel is oriented substantially vertically and the footprint occupied by the production line is less than 0.5 m².

SUMMARY OF THE INVENTION

According to specific embodiments of the invention, the production line also has one or more of the following features, considered alone or according to any technically possible combination(s):
  the production line comprises a remote control terminal for controlling the extruder and a wireless communication device for exchanging data between the extruder and the control terminal;
  the cooling member includes a sheath defining a passage for the extrudate and having at least one guide channel for guiding a cooling fluid around the passage;
  the cooling member is positioned below the barrel;
  the passage is oriented substantially vertically;
  the production line comprises a frame supporting the extruder and a movement mechanism to move the barrel relative to the frame along a substantially vertical direction; and
  the or each screw is elongated along a specific axis, the extruder comprises a driving device for rotating the or each screw around its axis, and the driving device and the or each screw comprise complementary cooperating members for the reversible fastening of the or each screw to the driving device, said cooperation members being suitable for preventing, when the or each screw is fastened, the translation of said screw along its axis relative to the barrel.

The invention also relates to a production plant for medicinal products comprising at least one active ingredient, said plant comprising a clean room in which the medicinal products are produced and a production line as defined above for producing said medicinal products, the extruder being placed in the clean room.

DETAILED DESCRIPTION

According to specific embodiments of the invention, the production plant also has one or more of the following features, considered alone or according to any technically possible combination(s):
  the production plant comprises a supply device for supplying the extruder with a powdered mixture comprising the or each active ingredient and the or each excipient, said supply device comprising an opening for receiving the powdered mixture placed outside the clean room; and
  the production plant comprises a control system for controlling the production line, said control system being placed outside the clean room.

BRIEF DESCRIPTION OF THE DRAWINGS

Other features and advantages will appear upon reading the following description, provided solely as an example and done in reference to the appended drawings, in which.

Figure 1:
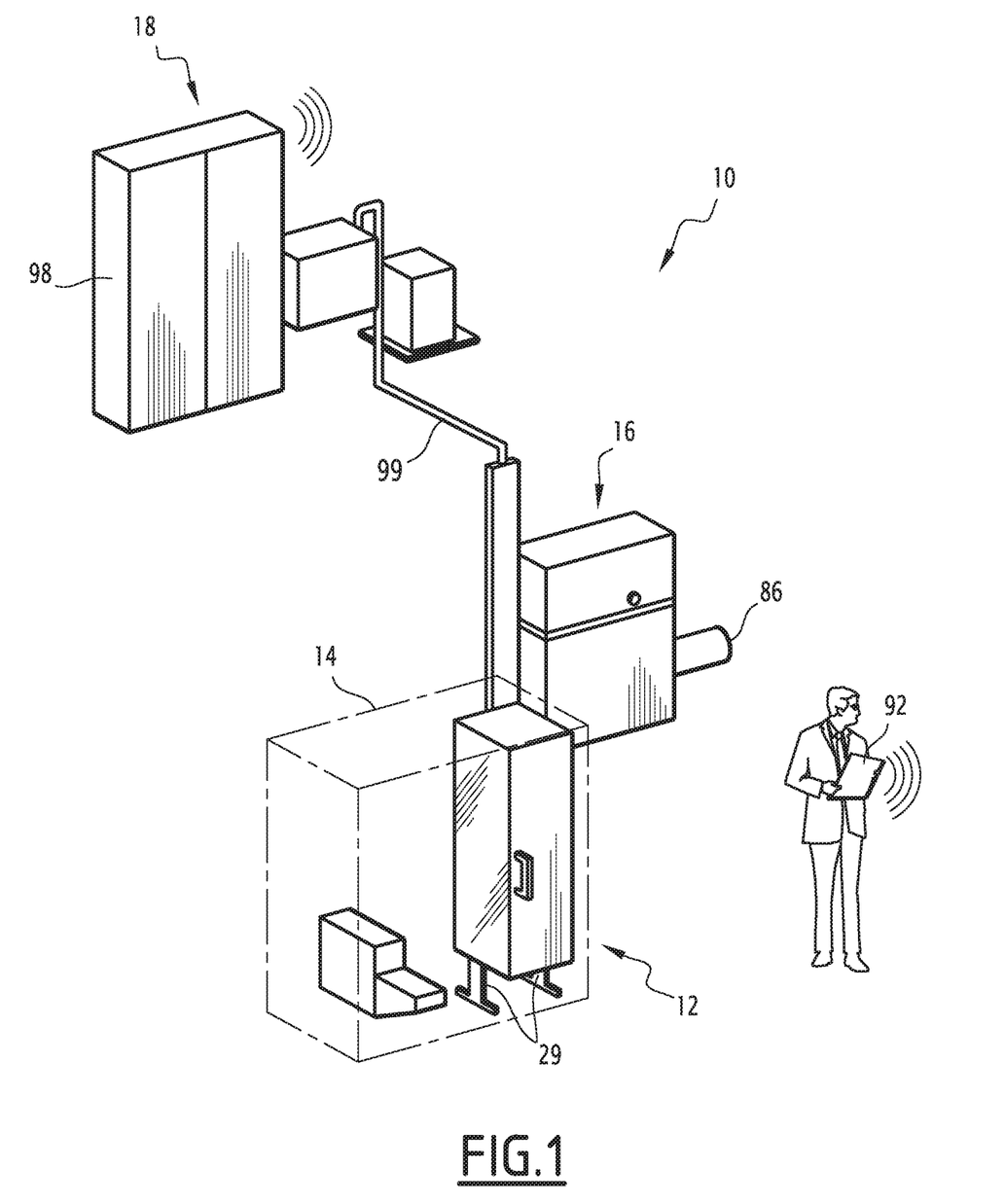
FIG. 1 is a perspective view of a production plant according to the invention.

The production plant 10 shown in FIG. 1 is a production plant for medicinal products (not shown) comprising at least one active ingredient (not shown). It comprises a production line 12, placed in a clean room 14 as defined within the meaning of standards ISO 14644, a supply device 16 for supplying the production line 12 with a powdered mixture comprising the or each active ingredient, and a control system 18 for controlling the production plant 10.

Figure 2:
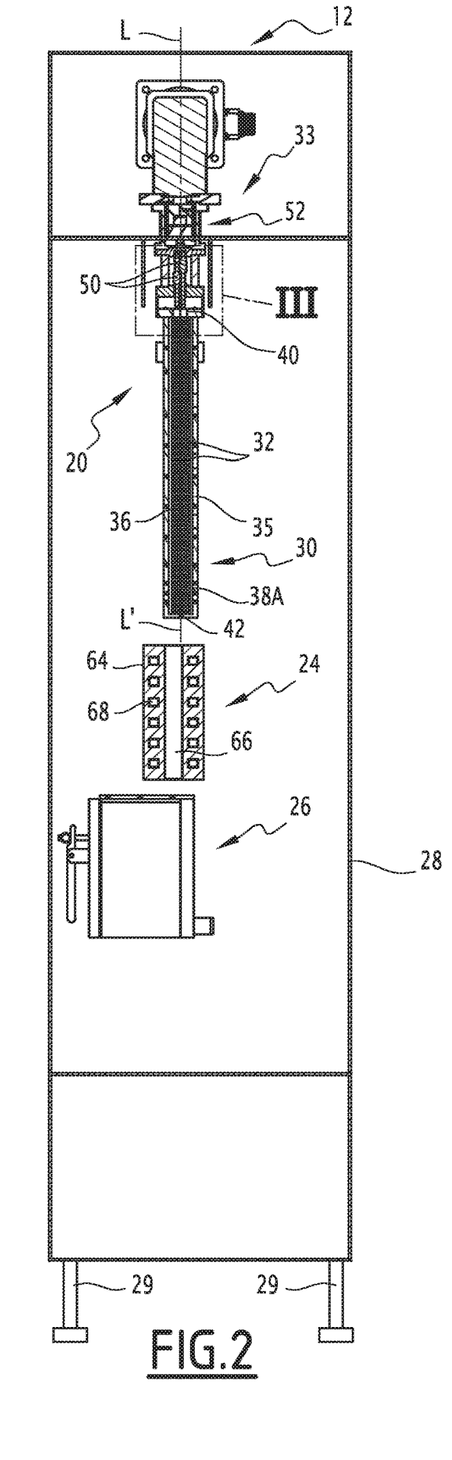
FIG. 2 is a partial sectional front view of a production line of the production plant of FIG. 1, according to a first variant of the invention.

In reference to FIG. 2, the production line 12 comprises an extruder 20 for producing an extrudate (not shown) from the active ingredient and at least one excipient (not shown) intended to form an encapsulating matrix for the active ingredient, a cooling member 24 for cooling the extrudate leaving the extruder, a cutting device 26 to cut the extrudate after it has been cooled, and a frame 28 supporting the extruder 20, the cooling member 24 and the cutting device 26.

The frame 28 comprises feet 29 together defining a contact surface with a floor (not shown). This contact surface is defined as being a horizontal surface, and any vertical direction is defined as being a direction perpendicular to said contact surface. Alternatively (not shown), the frame 28 does not comprise feet, and the contact surface with the floor is then defined by a bottom of the frame 28.

The extruder 20 comprises a barrel 30, at least two screws 32 housed in the barrel 30, a device 33 for rotating each screw 32 around its axis, and a system (not shown) for regulating the temperature of the barrel 30. In the illustrated example, the extruder 20 is a twin-screw extruder, such that there are two screws 32, which inter-penetrate one another.

The barrel 30 comprises a wall 35 surrounding a space 36 for receiving the screws 32. This wall 35 defines blind orifices (not shown) intended to receive temperature sensors (not shown) and inner channels (not shown) for the circulation of a cooling fluid. The wall 35 is formed by two half-shells 38A, 38B (FIG. 4) movable relative to one another to free access to the receiving space 36.

The barrel 30 is elongated along a longitudinal direction L-L'. According to the invention, this longitudinal direction L-L' is oriented substantially vertically. "Oriented substantially vertically" means that the angle formed by the longitudinal direction L-L' with the vertical is smaller than 15°, preferably smaller than 5°.

The barrel 30 has, at each of its longitudinal ends, an opening 40, 42 placing the receiving space 36 in communication with the outside of the barrel 30. The upper opening 40 constitutes a passage opening for the screws 32. The lower opening 42 constitutes an outlet opening for the extrudate; it preferably has a particular conformation based on the section one wishes to impart to the extrudate.

Figure 4:
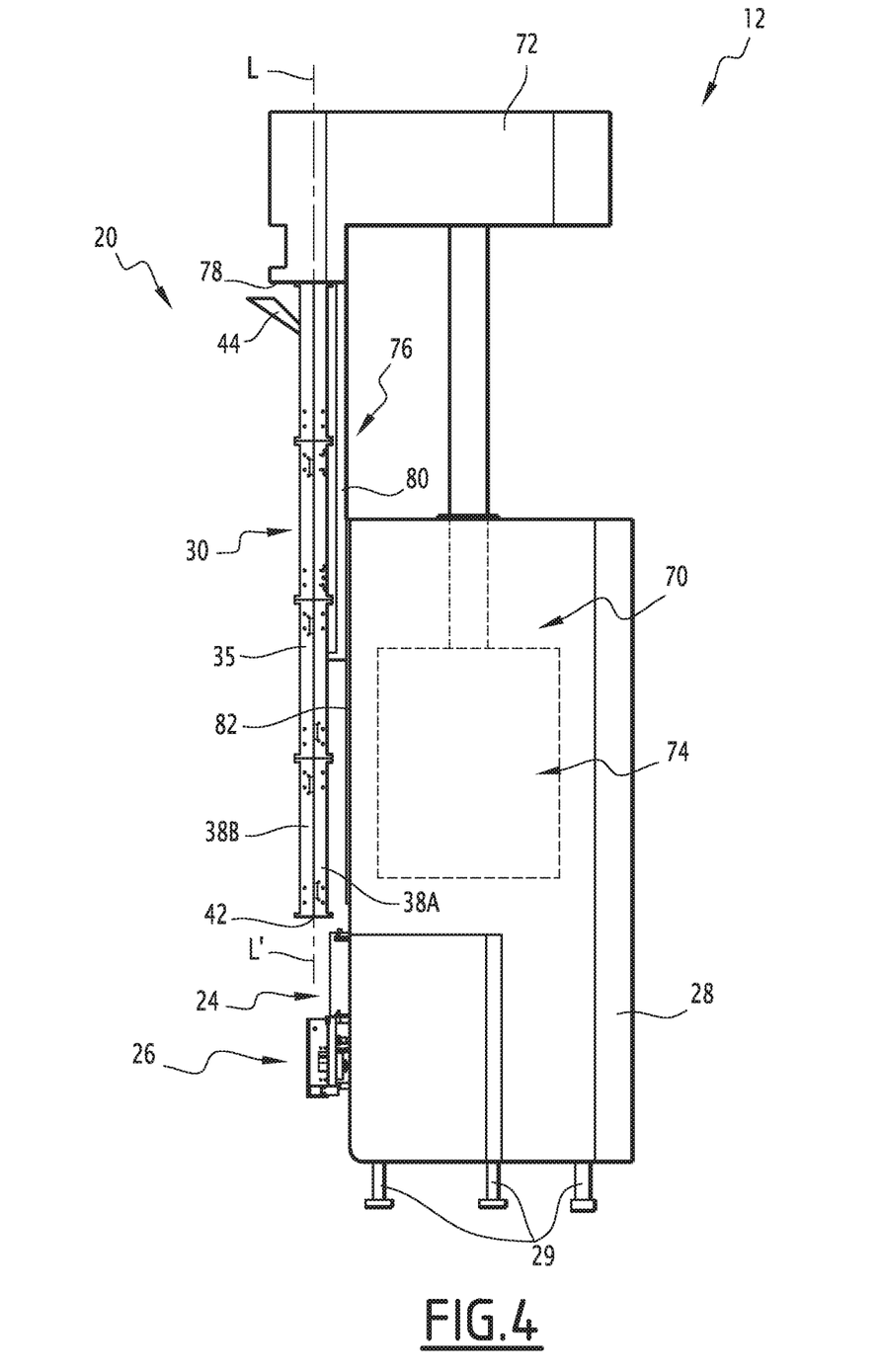
FIG. 4 is a side view of the production line of the production plant of FIG. 1, according to a second variant of the invention.

The wall 35 also defines a supply window (not shown) emerging in the receiving space 36 and outside the barrel 30 to supply the receiving space 36 with powdered mixture. This supply window is positioned close to the upper opening 40. It is preferably positioned at the base of a hopper 44 (FIG. 4).

Each screw 32 is elongated along a specific axis oriented substantially parallel to the longitudinal direction L-L' of the barrel 30. The screws 32 are thus parallel to one another. This allows the scale of the extruder 20 to be changed easily by increasing or decreasing the diameter of the screws 32 without having to review the design of the extruder 20.

Figure 3:
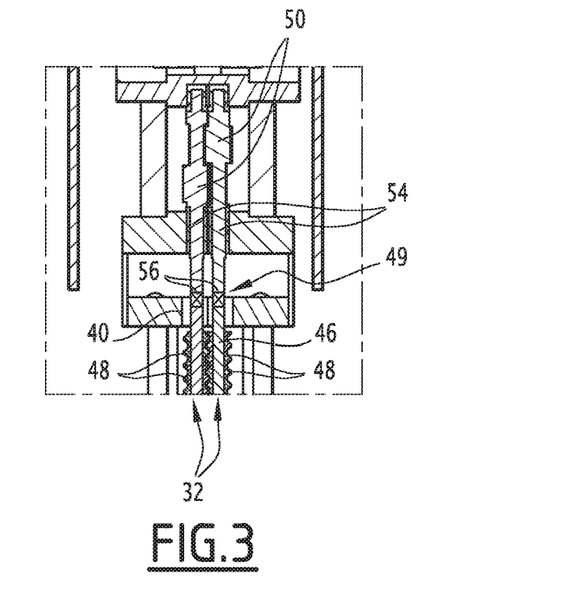
FIG. 3 is a view of a detail marked III in FIG. 2.

In the illustrated example, each screw 32 comprises a shank 46 and a plurality of screw elements 48 mounted on the shank 46 (FIG. 3).

The shank 46 extends along the axis of the screw 32.

Each screw element 48 has a generally cylindrical shape and has an outer thread and an inner axial orifice. The axial orifice has a radial section complementary to that of the shank 46, so as to immobilize the rotation of the screw element 48 relative to the shank 46 while allowing the translation of the screw element 48 relative to the shank 46 along the axis of the screw 32.

Preferably, the shank 46 has, at one of its ends, a stop (not shown) for the screw elements 48. The shank 46 also has, at its opposite end, a cooperating member 49 to cooperate with the driving device 33.

Alternatively, each screw 32 is formed in a single piece.

Each screw 32 has a diameter D such that the following equality is respected: L/D=40, where L is the length of the barrel 30, considered along its longitudinal direction L-L'.

In the first embodiment, this diameter D is comprised between 10 and 11 mm. In the second embodiment, this diameter D is comprised between 39 and 41 mm.

Returning to FIG. 2, the driving device 33 traditionally comprises a respective coupling shaft 50 for each screw 32 (i.e., in the illustrated example, two coupling shafts 50) and a gear motor 52 for rotating each coupling shaft 50 around its axis. Each coupling shaft 50 comprises a cooperating member 54 (FIG. 3) complementary to the cooperating member 49 supported by the screws 32 so as to allow the coupling of each screw 32 to its respective coupling shaft 50.

According to the invention, the cooperating members 49, 54 of each screw 32 and its respective coupling shaft 50 allow the screw 32 to be fastened reversibly to the coupling shaft 50 and are suitable for preventing, when the screw 32 is fastened, the translation of said screw 32 along its axis relative to the barrel 30.

To that end, the cooperating members 49, 54 comprise, in the illustrated example, a magnet 56 supported by one of the cooperating members 49, 54. Alternatively (not shown), one of the cooperating members 49, 54 comprises a threaded shank, and the other comprises a tapped orifice.

The system for regulating the temperature of the barrel 30 comprises a plurality of heating devices, an electrical circuit supplying the heating members with electricity, a circuit for the circulation of a cooling fluid for the barrel 30, and a plurality of sensors for measuring the temperature of the barrel 30.

Each heating device is typically formed by a heating resistance positioned near the barrel 30. Preferably, each heating device is associated with a respective segment of the barrel 30 heated by said heating device. It is thus possible to heat each segment of the barrel 30 independently.

The circulation circuit for the cooling fluid comprises the channels formed in the wall 35 of the barrel 30, a supply circuit for supplying said channels with cooling fluid, and valves for regulating the fluid flow rate in each channel.

Each temperature sensor is received in a respective blind orifice of the wall 35 of the barrel 30 and is typically made up of a thermocouple.

The cooling member 24 is positioned below the barrel 30, in particular below the lower opening 42 of the barrel 30.

The cooling member 24 includes a sheath 64 defining a passage 66 for the extrudate. The sheath 64 has channels 68 for the circulation of a cooling fluid around the passage 66, and the passage 66 is oriented substantially vertically. "Oriented substantially vertically" means that the angle formed by the axis of the passage 66 with the vertical is smaller than 15°, preferably smaller than 5°.

The cutting device 26 is positioned below the cooling member 24.

The barrel 30, the cooling member 24 and the cutting device 26 are substantially vertically aligned with one another.

The frame 28 is generally tower-shaped. It bears, on one of its faces, the barrel 30, the cooling member 24 and the cutting device 26.

In addition to the aforementioned features, which are shared by the first and second embodiments of the production line 12, the production line 12 according to the second embodiment comprises, in reference to FIG. 4, a moving mechanism 70 for moving the barrel 30 relative to the frame in a vertical direction.

This moving mechanism 70 in particular comprises a housing 72 for the driving device 33 of the extruder 20, the barrel 30 being fastened to said housing 72, and a jack 74 for the vertical movement of the housing 72 with respect to the frame 28. The moving mechanism 70 also comprises a member 76 for guiding the barrel 30 relative to the frame 28.

The housing 72 is positioned above the frame 28 and the barrel 30. It contains the gear motor 52 of the extruder 20, and the coupling shafts 50. The barrel 30 is fastened to a lower face 78 of the housing 72.

The jack 74 is preferably a screw-nut jack, optionally an electric screw-nut jack. Its shank (not shown) is fixed in translation along the vertical direction relative to the housing 72.

The guide member 76 comprises a crosshead 80 secured to a first element from among the frame 28 and the barrel 30, and a slide 82 secured to the second element from among the frame 28 and the barrel 30. In the illustrated example, the slide 80 is thus secured to the barrel 30, and the slide 82 is secured to the frame 28.

The slide 82 and the crosshead 80 cooperate with one another to guide the movement of the barrel 30 relative to the frame 28 along a substantially vertical direction. "Substantially vertical direction" means that the angle formed by said direction with the vertical is smaller than 15°, preferably smaller than 15°.

Figure 5:
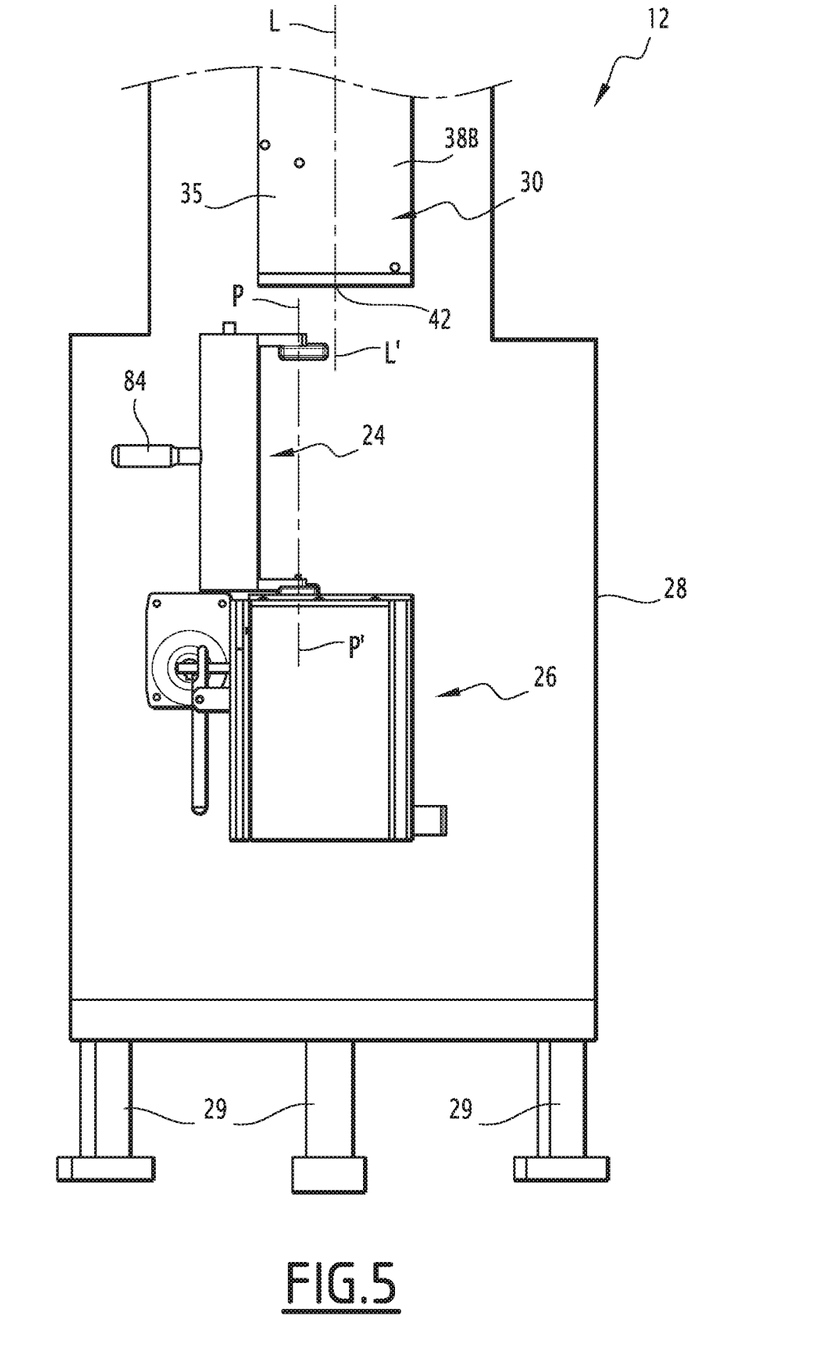
FIG. 5 is a front view of part of the production line of FIG. 4.

In reference to FIG. 5, the cooling member 24 is, in the second embodiment, movable relative to the frame 28 between a usage position, in which the cooling member 24 is substantially vertically aligned with the barrel 30, and a maintenance position, shown in FIG. 5, in which the cooling member 24 is separated, along a horizontal direction, from the barrel 30.

To that end, the cooling member 24 is, in the illustrated example, mounted pivoting relative to the frame 28 around a pivot axis P-P', said pivot axis P-P' being oriented substantially vertically and being spaced away from the axis of the passage 66 by a distance greater than the mean half-diameter of the cooling member 24. "Oriented substantially vertically" means that the angle formed by the pivot axis P-P' with the vertical is smaller than 15°, preferably smaller than 15°.

Preferably, as shown, the cooling member 24 has a control lever 84 to facilitate the movement of the cooling member 24 relative to the frame 28.

Returning to FIG. 1, the supply device 16 comprises an opening 86 for receiving the powdered mixture, and an outlet (not shown) for dispensing the powdered mixture.

The receiving opening 86 is placed outside the clean room 14.

The dispensing outlet is positioned in the clean room 14, above the hopper 44 of the extruder 20.

Preferably, the supply device 16 also comprises a remotely controlled system (not shown) for metering the quantity of powdered mixture dispensed through the outlet.

Figure 6:
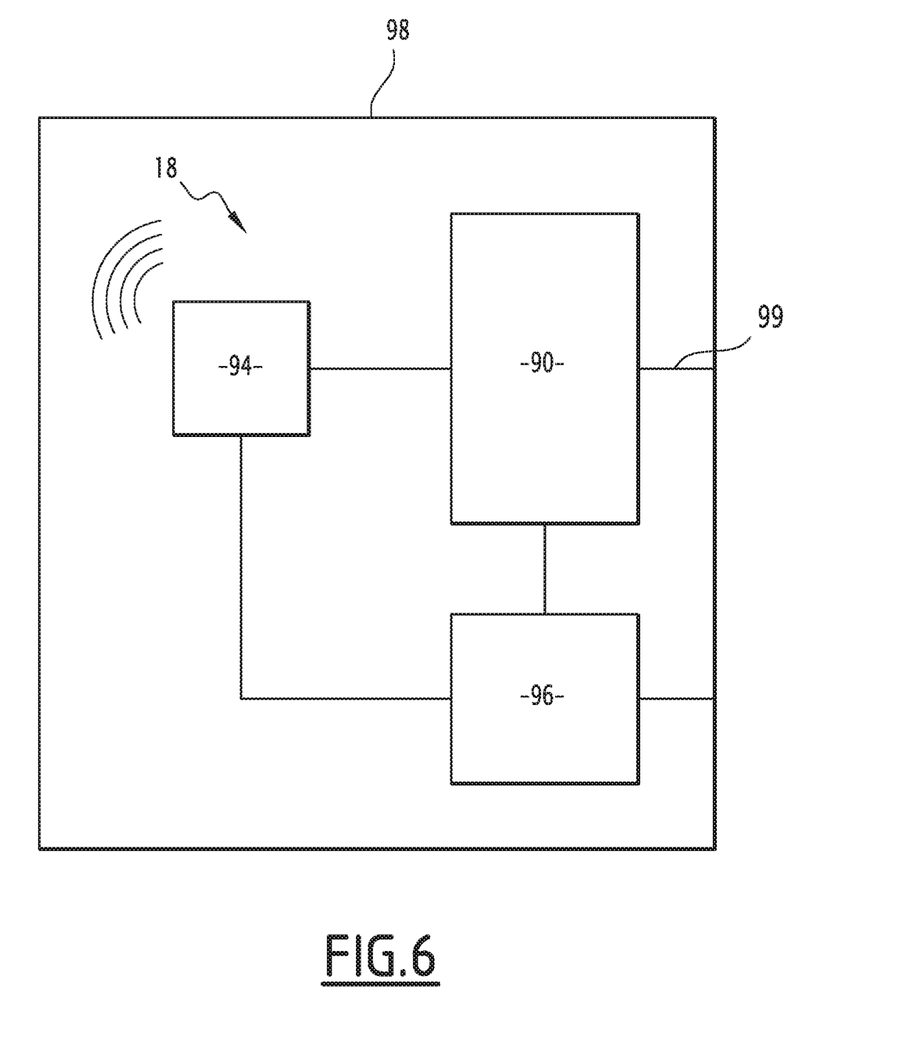
FIG. 6 is a schematic view of an electrical cabinet housing part of a control system for the production plant of FIG. 1.

The control system 18 comprises, in reference to FIG. 6, a control unit 90, a control terminal 92 (FIG. 1), a wireless communication device 94 for exchanging data between the control unit 90 and the control terminal 92, and a member 96 for shaping an electrical supply current from the control unit 90.

The control unit 90, the wireless communication device 92 and the shaping member 96 are housed in a same electrical cabinet 98 placed outside the clean room 14. The control terminal 92 is outside the electrical cabinet 98.

The control unit 90 is programmed to control the temperature regulating system of the extruder 20, the driving device 33, the cooling member 24 and the cutting device 26. To that end, the control unit 62 is electrically connected to the production line 12 and to the supply device 16 via an electrical line 99.

The control unit 90 is also suitable for converting the data received by the wireless communication device 94 into control signals of the gear motor 52, valves and heating devices, and converting the signals received from the temperature sensors into data able to be interpreted by the control terminal 92.

The control terminal 92 is preferably made up of a mobile terminal, typically a touch-sensitive tablet. It comprises a wireless communication module (not shown) compatible with the wireless communication device 94, and a man-machine interface for displaying information intended for an operator and the entry of command instructions entered by the operator.

The wireless communication device 94 preferably has a range greater than 10 m in open space. To that end, the wireless communication device 94 is typically made up of a Wi-Fi device.

A method for using the production plant 10 will now be described in reference to the figures.

Initially, the production line 12 is clean, and no powdered mixture is contained in the supply device 16.

An operator begins by entering the clean room 14 to turn on the production line 12. He next leaves the clean room 14, and pours a quantity of powdered mixture into the opening 86 of the supply device 16. He then grasps the control terminal 22, and enters an instruction to launch production of the medicinal product.

The instruction entered by the operator is received by the wireless communication device 92, and interpreted by the control unit 90. The latter then sends control signals to the gear motor 52 and the temperature regulating system of the barrel 30 to rotate the screws 32 around their axes and adjust the temperatures of the various segments of the barrel 30 to predetermined temperatures.

The metering system of the supply device next causes a predetermined dose of powdered mixture to fall into the hopper 44. This dose is led by the hopper 44 into the barrel 30, where, under the effect of the heating, it is melted, and where the components of the powdered mixture 30 are mixed with one another owing to the action of the screws 32 on the mixture.

The screws 32 drive the mixture toward the lower opening 42 of the barrel 30, through which it leaves in the form of an extrudate. This extrudate next traverses the passage 66 of the cooling member 24, where it is cooled to ambient temperature. The cooled extrudate next enters the cutting device 26, where it is cut into sticks.

Production can be continued by introducing new quantities of powdered mixture into the opening 86 when the supply device 16 is empty, and by controlling the production line 12 using the control terminal 22, without an operator entering the clean room 14 at any time.

When production of the medicinal products is complete, the operator once again enters the clean room 14, this time to turn off the production line 12. He then cleans the extruder 20.

To that end, the operator opens the barrel 30 and detaches the screws 32 from the driving device 33. Next, the operator withdraws, for each screw 32, the screw elements 48 from the shank 46, and individually cleans the screw elements 48 and the shank 46. At the same time, the operator cleans the receiving space 36. The operator next replaces the screw elements 48 on the shanks 46, reattaches the screws 32 to the driving device 33 using the cooperating members 49, 54, and closes the barrel 30.

In the second embodiment, where, due to its considerable length, the barrel 30 and the screws 32 are difficult to manipulate, the operator moves the barrel 30 downward prior to cleaning the extruder 20.

To that end, the operator begins by moving the cooling member 24 toward its maintenance position, so as to clear a free space at the vertical below the barrel 30. The operator next actuates the device 74, so as to lower the barrel 30 downward.

After cleaning the extruder 20, the operator raises the barrel 30 upward by performing the operations described above, in the opposite direction.

Owing to the invention described above, it is possible to produce medicinal products by extrusion while only monopolizing a very small footprint in the clean room. The equipment that does not need to be placed in the clean room 14, such as the supply device 16 and the control system 18, being placed outside the clean room 14, occupied space in the clean room 14 is in fact saved. It is thus possible to limit the footprint monopolized in the clean room solely to the surface area occupied by the production line 12. Furthermore, since the barrel 30 is oriented vertically and no longer horizontally, and since the elements making up the production line 12 are positioned vertically with respect to one another, the footprint occupied by the production line 12 is significantly reduced and is thus smaller than 0.5 m².

Furthermore, the risks of contamination of the clean room are decreased considerably. Indeed, the production of medicinal products can be done with no operator present in the clean room 14, and the only operator interventions necessary on the equipment present in the clean room are when the production line 12 is started up and during the operations to clean the production line 12. While the comings and goings of operators in the clean room normally represent substantial risks of contamination of the clean room, here they are minimized, which consequently significantly limits the risks of contamination of the clean room.

What is claimed is:

1. A production plant for the production of medicinal products comprising at least one active ingredient, said production plant comprising a clean room in which the medicinal products are produced, wherein the production plant comprises a production line for the production of said medicinal products comprising the at least one active ingredient, the production line comprising an extruder, for producing an extrudate from the at least one active ingredient and at least one excipient to form an encapsulating matrix of the at least one active ingredient, and a cooling member for cooling the extrudate at the outlet of the extruder, the extruder comprising a barrel and at least two parallel screws housed in the barrel and interpenetrating with one another to mix the at least one active ingredient with the at least one excipient, wherein the barrel is oriented vertically and wherein the cooling member includes a sheath defining a passage for the extrudate and having at least one guide channel for guiding a cooling fluid around the passage, the extruder being placed in the clean room.

2. The production plant according to claim 1, wherein the footprint occupied by the production line is less than 0.5 m².

3. The production plant according to claim 1, comprising a remote control terminal for controlling the extruder and a wireless communication device for exchanging data between the extruder and the control terminal.

4. The production plant according to claim 1, wherein the cooling member is positioned below the barrel.

5. The production plant according to claim 1, wherein the passage is oriented vertically.

6. The production plant according to claim 1, comprising a frame supporting the extruder and a movement mechanism to move the barrel relative to the frame along a vertical direction.

7. The production plant according to claim 1, wherein each screw is elongated along a specific axis, the extruder comprises a driving device for rotating each screw around its axis, and wherein the driving device and each screw comprise complementary cooperating members for reversibly fastening each screw to the driving device, said cooperation members being suitable for preventing, when each screw is fastened, the translation of said screw along its axis relative to the barrel.

8. The production plant according to claim 1, comprising a supply device for supplying the extruder with a powdered mixture comprising the at least one active ingredient and the at least one excipient, said supply device comprising an opening for receiving the powdered mixture placed outside the clean room.

9. The production plant according to claim 1, comprising a control system for controlling the production line, said control system being placed outside the clean room.

10. A method for producing a medicinal product, comprising:
   providing a production plant for the production of medicinal products comprising at least one active ingredient, said production plant comprising a clean room in which the medicinal products are produced, wherein the production plant comprises a production line for the production of said medicinal products comprising at least one active ingredient, the production line comprising an extruder, for producing an extrudate from the active ingredient and at least one excipient to form an encapsulating matrix of the active ingredient, and a cooling member for cooling the extrudate at the outlet of the extruder, the extruder comprising a barrel and at least two parallel screws housed in the barrel and interpenetrating with one another to mix the at least one active ingredient with the at least one excipient, wherein the barrel is oriented vertically and wherein the cooling member includes a sheath defining a passage for the extrudate and having at least one guide channel for guiding a cooling fluid around the passage, the extruder being placed in the clean room, extruding the at least one active ingredient and the at least one excipient from the extruder of the production line to form the extrudate, and cooling the extrudate at the outlet of the extruder.

11. A method for producing a medicinal product according to claim 10, comprising:

supplying the production line with a powdered mixture comprising the at least one active ingredient, melting the components of the powdered mixture in the extruder, mixing these components under the action of the screws, using the screws to drive these mixed components toward an outlet of the extruder, through which they leave in the form of an extrudate, and cooling the extrudate using the cooling member.

\* \* \* \* \*